(12) United States Patent
Chapman

(10) Patent No.: US 8,688,702 B1
(45) Date of Patent: Apr. 1, 2014

(54) TECHNIQUES FOR USING DYNAMIC DATA SOURCES WITH STATIC SEARCH MECHANISMS

(75) Inventor: Murray Leigh Chapman, Carnation, WA (US)

(73) Assignee: IMDb.com, Inc., Seattle, WA (US)

( * ) Notice: Subject to any disclaimer, the term of this patent is extended or adjusted under 35 U.S.C. 154(b) by 257 days.

(21) Appl. No.: 12/881,453

(22) Filed: Sep. 14, 2010

(51) Int. Cl.
*G06F 7/00* (2006.01)
*G06F 17/30* (2006.01)

(52) U.S. Cl.
USPC ........... 707/736; 707/737; 707/754; 707/758; 707/759; 707/769

(58) Field of Classification Search
USPC ................. 707/705, 736, 737, 758, 759, 769, 707/999.3, 754
See application file for complete search history.

(56) References Cited

U.S. PATENT DOCUMENTS

| | | | |
|---|---|---|---|
| 7,409,386 B2 * | 8/2008 | Hongell et al. | 707/763 |
| 7,668,811 B2 * | 2/2010 | Janssens et al. | 707/719 |
| 2001/0051956 A1 * | 12/2001 | Bird | 707/203 |
| 2006/0242284 A1 * | 10/2006 | Savage | 709/223 |
| 2008/0141003 A1 * | 6/2008 | Baker et al. | 712/220 |
| 2010/0076960 A1 * | 3/2010 | Sarkissian et al. | 707/722 |
| 2010/0082690 A1 * | 4/2010 | Kenigsberg et al. | 707/792 |
| 2010/0228794 A1 * | 9/2010 | Roy et al. | 707/809 |
| 2011/0258177 A1 * | 10/2011 | Wu et al. | 707/711 |
| 2012/0030018 A1 * | 2/2012 | Passmore et al. | 705/14.52 |

* cited by examiner

*Primary Examiner* — Hares Jami
(74) *Attorney, Agent, or Firm* — Novak Druce Connolly Bove + Quigg LLP

(57) ABSTRACT

Systems and methods are presented for searching a dynamic data source using a static search engine. In one embodiment, the method includes: determining that a search request for data includes at least one attribute associated with dynamic data, retrieving dynamic data associated with the at least one attribute and corresponding to the search request, combining the retrieved dynamic data with static data that corresponds to the search request, and returning the combined data in response to the search request. The dynamic data may be located separately from the static data, for example, at a remote storage and may be searched in parallel with the static data if necessary. The retrieved dynamic data may be combined with the static data and returned to the user.

19 Claims, 6 Drawing Sheets

TECHNIQUES FOR USING DYNAMIC DATA SOURCES WITH STATIC SEARCH MECHANISMS

BACKGROUND

Various methods of searching for data stored in various types of data stores have proliferated recently, particularly methods of Web-based searching that appeared with the advancement of the Internet. Through data search services provided over the Web, for example, users can search for, and access, various types of information of interest to those users. For example, users interested in filmography may search for, and obtain from an Internet-accessible data source, information related to various movies, actors, history of movie making, plot summary, and the like using simple keyword-based search queries.

Data available for search may be stored in different data storage locations, or data stores. Types of data may be categorized in a number of different ways. For example, searchable data may be roughly divided into two categories: "static" and "dynamic." "Static" data may be data that is not volatile, e.g., data that does not change and/or does not have to be updated often. This can include, for example, data updated only once a week, once a month, or less. "Dynamic" data, on the contrary, has to be updated much more often, such as once every few minutes, every few seconds, or even more often. Typically, updating data in a data source requires re-indexing of all data before it can be searched. Thus, if dynamic and static data are combined in one searchable data source, all the data in the data source might have to be re-indexed every time new data is added to the data source. If the data store contains a large volume of data and is frequently updated with new data, re-indexing all the data in the data source makes combining dynamic and static data prohibitively expensive. Furthermore, such a data source that combines static and dynamic data would become substantially more complex and prone to errors. Yet further, if a volume of dynamic data exceeds a certain threshold, it may not be feasible to store that volume in a single data store.

DETAILED DESCRIPTION OF THE INVENTION

Figure 1:
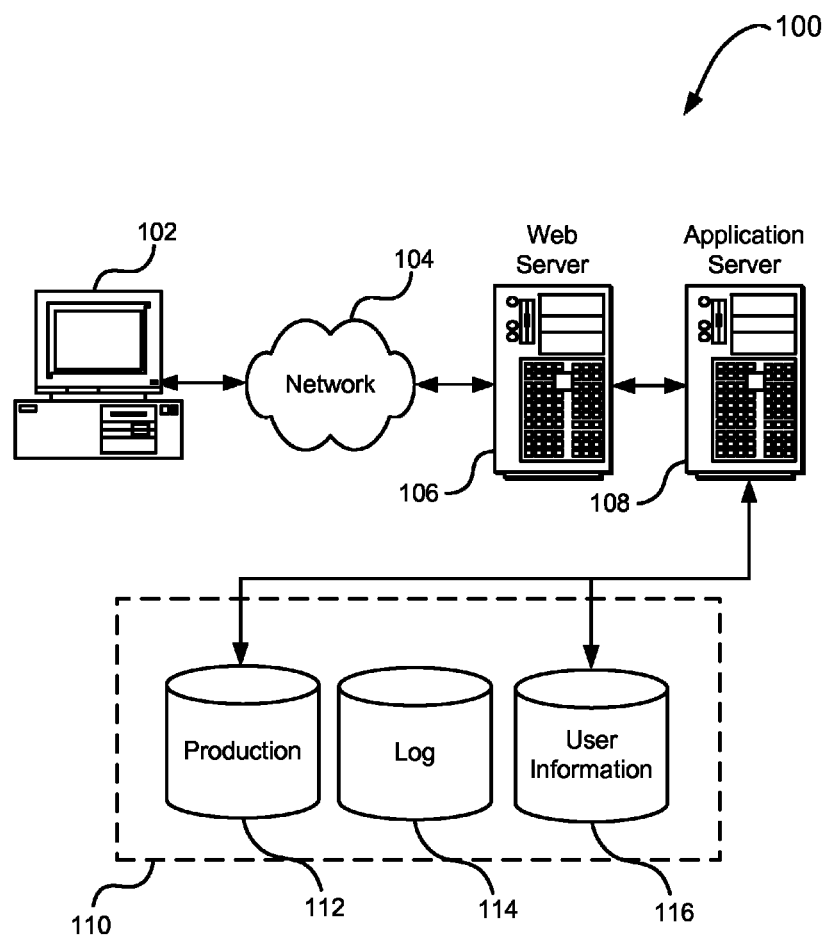
FIG. 1 illustrates an environment in which various embodiments can be implemented.

Systems and methods are presented that allow a static data search engine, configured to search data sources containing static data, to search, and incorporate, dynamic data into search results. This can include, for example, adding one or more dynamic data sources that can be accessed and utilized by the static search engine. This enables the static data search engine to search a wider array of data and return the most recent search results. In an embodiment, the static search engine may be configured to search only dynamic data sources. Alternatively, the static search engine may be configured to search both dynamic and static data sources at the same time and then combine the results of the search.

For example, in the context of a movie data store, data stored in the data store indicating that George Clooney is listed in the credits for the movie Ocean's Eleven is static data (e.g., will not change). This type of data may be preloaded into a data store and not updated. On the other hand, user reviews of a particular movie may be added to the data store at any time and can change often (dynamic data). For example, users may add their ratings, reviews, and other types of comments to a particular movie at any time. Combining dynamic and static data in one data source in order to make both types of data equally available for searching may present significant challenges. Systems and methods described herein allow a search engine configured to search the static data to also search the dynamic data by dynamically fetching dynamic data from another data store, such as at a remote data source (storage), and present search results that may include both the static and retrieved dynamic data pertaining to the same search attribute (e.g., the same document identifier).

One skilled in the art will recognize that various search platforms and engines have been developed in order to provide for efficient searching for data, for example, for documents, for information within documents, and/or for meta-data about documents, as well as for searching different types of data stores (e.g., relational databases) and the World Wide Web, such that detailed descriptions of these processes are not necessary herein. The data may be organized in software libraries suitable for applications having full text indexing and searching capability. Text from different formats, such as PDF, HTML, Microsoft Word®, and OpenDocument®, as well as many others, can all be indexed so long as their textual information can be extracted. One example of a software library known to those skilled in the art is Apache Lucene®, an open source information retrieval software library.

Various search tools, local or Internet-based, may be employed for searching software libraries. An example of such a tool is Apache Solr®, an open source enterprise search server, based on the Apache Lucene® search library. Solr's major features include full-text search, hit highlighting, faceted search, dynamic clustering, database integration, and rich document (e.g., Word, PDF) handling. Solr® powers the search and navigation features of many of the world's largest Internet sites. Various techniques described herein have been implemented on the Lucene/Solr® platform. However, the described techniques may be implemented on any other suitable software platform and should not in any way be construed as limited to Lucene/Solr® implementation.

Various techniques comprise querying static data stored in a storage, such as a software library, with determined search criteria contained in a search request. The query may contain a plurality of query clauses created by a search engine or other appropriate source. Normally, the query may be processed in a standard way known in the art and the relevant search results may be returned to a user. However, a search engine in accordance with various embodiments can be configured to extend a standard query to include one or more additional, "external" attributes (e.g., identifiers) pertaining to dynamic data that is not stored in the static data store, but in a different data source, such as a remote (e.g., "in the cloud") data source. A search engine parsing the query can be configured to recognize one or more of these external attributes. If one or more external attributes are intercepted, received, or otherwise detected, external query clauses associated with the external attributes may be generated or otherwise determined, and the resulting query may be processed using any suitable approach discussed or suggested herein. In one embodiment, the query may contain one or more external attributes and no attributes pertaining to static data. Then, the search engine may be configured to retrieve search results from one or more dynamic data sources that pertain to the external attributes.

Specifically, in one embodiment a remote service is called when an external clause is included. The remote service in this example is configured to fetch dynamic data corresponding to the attribute(s) contained in the external clause. The dynamic data is returned in an appropriate form, such as a list of document identifiers. Results may include any type of identifier, for example, a document identifier (hereinafter "public identifier") associated with a data item. The static data is then combined (if needed) with dynamic data retrieved from the remote storage and returned to a user. In one embodiment, if the dynamic data needs to be filtered, the identifiers of the returned dynamic data sources may be matched with ones pertaining to data stored in the static data store. If any matches are found, the matched static data is merged with the dynamic data and returned to the user. A user thus can be provided with the capability to search and obtain a combination of static data that was preloaded into the data store before the search commenced with dynamic data from a different data source that may have been continuously or at least frequently updated up to the actual query time. In one embodiment, a user may search and obtain just the dynamic data from one or more dynamic data sources. In summary, different sources of information may be searched, and the search results may be compiled without having to collect all the data in one place at one time and update and reconfigure all the collected data frequently.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, and the environment includes a Web server 106 for receiving requests and serving content in response thereto, although for other networks, an alternative device serving a similar purpose could be used, as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein, the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to a viewer, which may be served to the viewer by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing log data 114, which can be used for reporting, generating statistics, and other such purposes. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 and obtain, update, or otherwise process data in response thereto. In one example, a viewer might submit a search request for a certain type of item. In this case, the data store might access the user information to verify the identity of the viewer, and can access the catalog detail information to obtain information about items of that type. The information then can be returned to the viewer, such as in a results listing on a Web page that the viewer is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
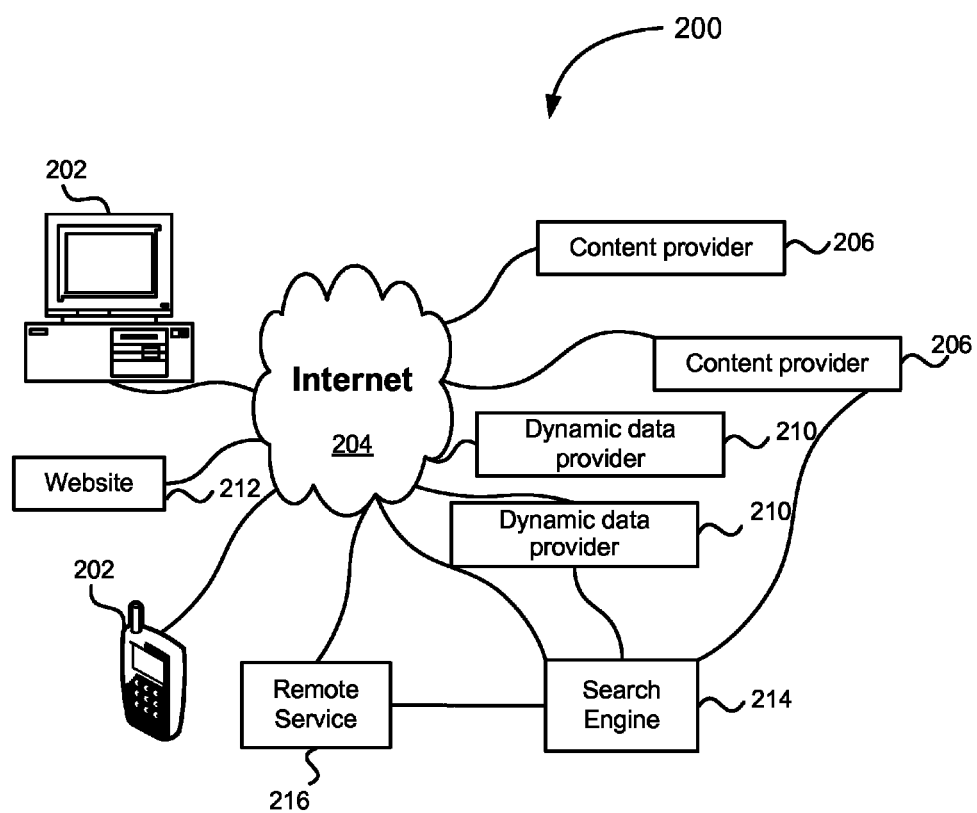
FIG. 2 illustrates an environment in which various embodiments may be practiced.

FIG. 2 shows an example environment 200 in which various embodiments may be practiced. The environment 200 may be realized utilizing one or more of the components of the environment described above in connection with FIG. 1. The environment 200, in an embodiment, includes a plurality of users operating client computing devices 202 that utilize a network such as the Internet 204 to browse and/or search content of various content providers 208 and/or 210. While the environment 200 shows the client computing devices 202 utilizing the Internet, it should be understood that other networks may be used as an alternative to or in addition to the Internet 204. Examples of other networks include mobile networks, intranets, and generally any suitable communications network. Likewise, it should be understood that client computing devices 202 may include personal computers, cell phones, handheld messaging devices, laptop computers, set-top boxes, personal data assistants, electronic book readers, game consoles, smart phones, tablet devices and the like.

In an embodiment, users may interact through devices 202 with other entities, sources, or services in order to search content, such as information and the like. As used herein, information includes any searchable data item, instance, or portion thereof which may be requested by a user. Examples include electronic items which may be downloaded and/or streamed, including audio files, video files, and other digital content. The data items may correspond to items (e.g., products or services) offered for consumption (e.g., purchase, lease, rent, subscribe, or download) for one or more customers (e.g., users or consumers). Examples of data items offered for consumption may also include services which may be performed for and/or on behalf of consumers (including any combination of products and services). As shown in FIG. 2, the environment 200 includes an electronic entity, or content provider 206. The content provider 206, for example, may operate an electronic library such that the users may submit, via devices 202, search requests for data items stored by the content provider 206. The content provider 206 may offer information that the provider operates itself and may fulfill search requests for the data items itself, such as by using its own storage platform and search engine. In some embodiments, the content provider 206 offers searchable information to one or more third-party search entities. The content provider 206 may also operate systems, such as those described above in connection with FIG. 1, that enable others to utilize the systems to offer data items for search and consumption. In short, the content provider 206 may facilitate user search and consumption of items or products offered by the content providers 206 and/or 210.

For example, in an embodiment, the environment 200 includes one or more content providers 210 that store dynamic data (e.g., data that can be regularly modified). In an embodiment, a dynamic content provider is an entity that offers search data that is volatile ("dynamic") and is not stored with the static data provided by the content provider 206. In some embodiments, the dynamic content provider might also be the content provider 206, where the dynamic data is stored in a separate system or data store, etc. Dynamic content providers 210 may cooperate with the static content providers 206 in various ways. In one embodiment, both dynamic and static data may be provided by a single entity, e.g., content provider 206 or the content provider 210. In one embodiment, the content provider 206 may operate an electronic marketplace, such as a Web site 212 and facilitate data search for data offered by the content providers 206 and 210. In one embodiment, content providers 210 may utilize various systems provided by the content provider 206, such as electronic search systems that enable users to search for data items, and other systems. It is understood that the Web site 212 facilitating the data search may be provided by a different entity altogether.

In an embodiment, third party content providers may operate one or more Web sites 212 from which information may be retrieved if required by a search query. One or more of the Web sites 212 may be operated by the static content provider 206 or the dynamic content provider 210, although they need not be. The Web sites 212 may offer, or facilitate a search for, various types of content, such as news, video, shopping for products, and the like. The Web sites 212 may offer other services, such as content or product search services, audio, social networking services, and the like. While the example environment 200 shows Web sites for the purpose of illustration, it should be understood that any type of content may be included in the environment 200 or variations thereof. For example, searchable content may be provided in various ways, such as through an application interface or through other mechanisms that may not be properly classified as Web sites.

As noted, in an embodiment, the users may interact with content from the various content providers such as by searching products offered by the entities, viewing content from the entities, consuming items from the entities, and the like. In order to search for products or other content provided by the entities, the users may utilize a Web search engine 214. As one skilled in the art will appreciate, a Web search engine may be software or a combination of software and hardware designed to search for information on the Internet or in a storage facility, such as a software library operated by the content provider 206 as described above. The search engine may be rendered to a client device 202 via a particular Web site or Web sites, such as the Web sites 212. The Web search engine 214 may be affiliated with the content provider 206 in a number of different ways, such as, for example, it may be designed and/or owned by the content provider 206, operated by the content provider 206, contracted by the content provider 206, be independent or autonomous from the content provider 206, and the like. In one embodiment, the search engine 214 may include, or associate with, a remote service 216 configured to access dynamic data provided by the dynamic data provider 210. The operating of the search engine 214 and the remote service 216 will be described below in greater detail.

Figure 3:
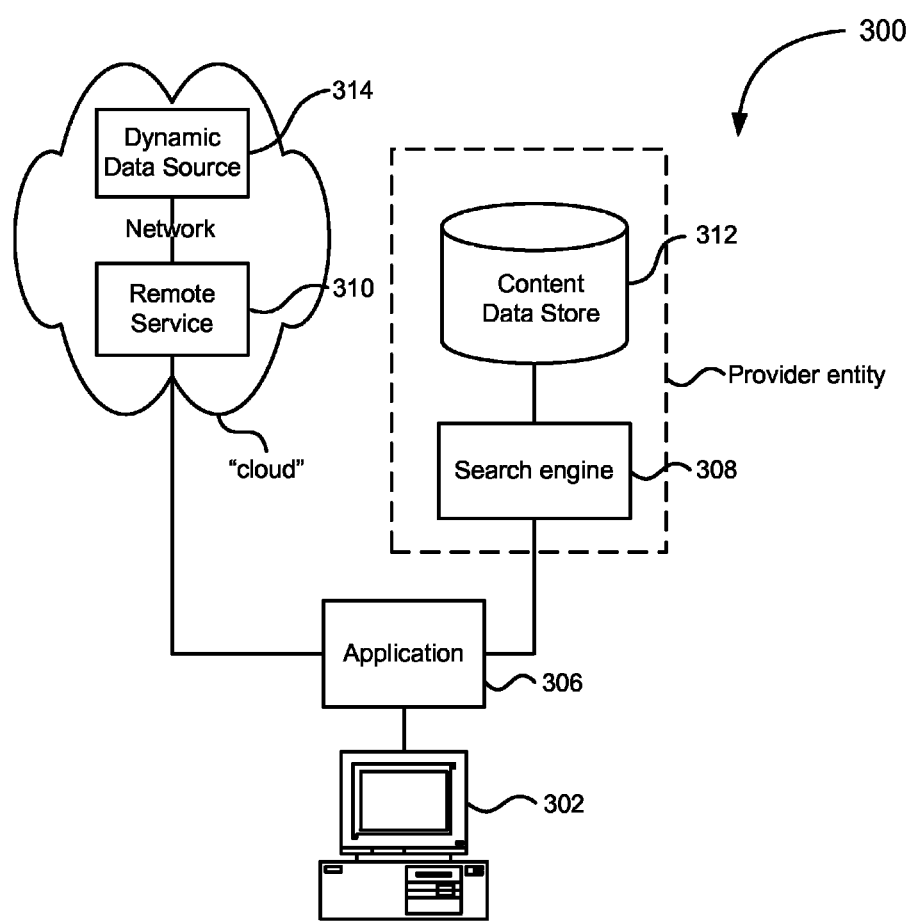
FIG. 3 illustrates a diagrammatic representation of an environment which may incorporate one or more components that are described above in connection with FIG. 1 and that may be used in accordance with various embodiments.

FIG. 3 shows an illustrative environment 300 that an electronic entity such as the content provider 206 may utilize in order to provide a user with an ability to repeatedly search for static and dynamic data items or other content offered by the content providers 206 and/or 210. The environment 300 may be implemented to increase search efficiency for the users utilizing one or more client devices 202 and thus increase effectiveness for one or more of the entities 206 and/or 210 shown in FIG. 2. In an embodiment, the environment 300 of FIG. 3 is utilized by an electronic entity (such as the content provider 206) to provide a searching capability via a remote service configured to retrieve, and if necessary, add dynamic data to a static search engine described herein. It is to be understood that the remote service used in conjunction with the search engine may comprise a number of various implementations, including but not limited to, a software application component executed on a computing device, such as one or more Web servers. In one embodiment, the service may be offered as a part of remote computing services that together make up a cloud computing platform, offered over the Internet. The service may be configured to run in a Web server environment, such as a pure Java HTTP Web server environment.

In an embodiment, the environment 300 includes a client computer device 302 configured to access a search engine 308 may be accessible through an application 306. The search engine 308 is configured to search static data in at least one content data store 312. In one embodiment, the search engine 308 and the data store 312 may be owned or operated by a single entity, such as a content provider entity. The application 306 may be configured to provide access to the search engine 308 to the client computer device 302 and may be operated by the provider entity as shown in FIG. 3. The search engine 308 is further configured to engage, or associate with, a service 310 (hereinafter called "remote service"). The remote service 310 is configured to access at least one dynamic data source, such as a remote data store 314. An illustrative implementation of the search engine 308 and the remote service 310 will be discussed later in greater detail.

The content data store 312 provides searchable static content to users utilizing the search engine 308. For example, content may include documents, products or items of various types. The content stored in the content data store 312 may be utilized by merchants, Web sites, or other entities in order to provide users an opportunity to search and consume provided content. In an embodiment, the content data store 312 may store content to be provided to users, such as when users request the content using the search engine 308.

In an embodiment, the remote service 310 provides a user with the ability to search for dynamic data alone or in combination with searching for data provided by the content data store 312, as will be described later at greater detail. The search engine 308, in an embodiment, utilizes information such as identifiers of the data items returned by the remote service 310 from the dynamic data store 314. In one embodiment, the search engine 308 may reside on a remote server, e.g., in a "cloud" as shown in FIG. 3 The data stores 312 and 314 may be implemented in a number of different ways. For example, in an embodiment, the data store 312 may comprise a dedicated database or software library accessible by the search engine 308. In some Web environments, such as, for example, one provided by the HyperText Markup Language (HTML) 5, the data store 312 may be allocated within a Web site or within a domain. In one example, the data store 312 may be embedded in the pages of a Web site and may be shared with any page visited by the user on that Web site. Similarly, the external, or "remote" dynamic data store 314 may be implemented in a number of different ways. For example, the dynamic data store may be implemented in a "cloud" as illustrated in FIG. 3 or reside on a server or servers operated by a third party providing the data. Alternatively, the dynamic data store may be located locally and operated by a third party or the entity 206 as discussed above. One skilled in the art will appreciate that the remote data store or dynamic data store are simply terms of art that in no way limit the data store to its "remote" or "dynamic" implementations. Indeed, the data store 314 may comprise a combination of dynamic and static data. The operation of the search engine 308 and the remote service 310 will be discussed below in reference to FIGS. 4-6.

Figure 4:
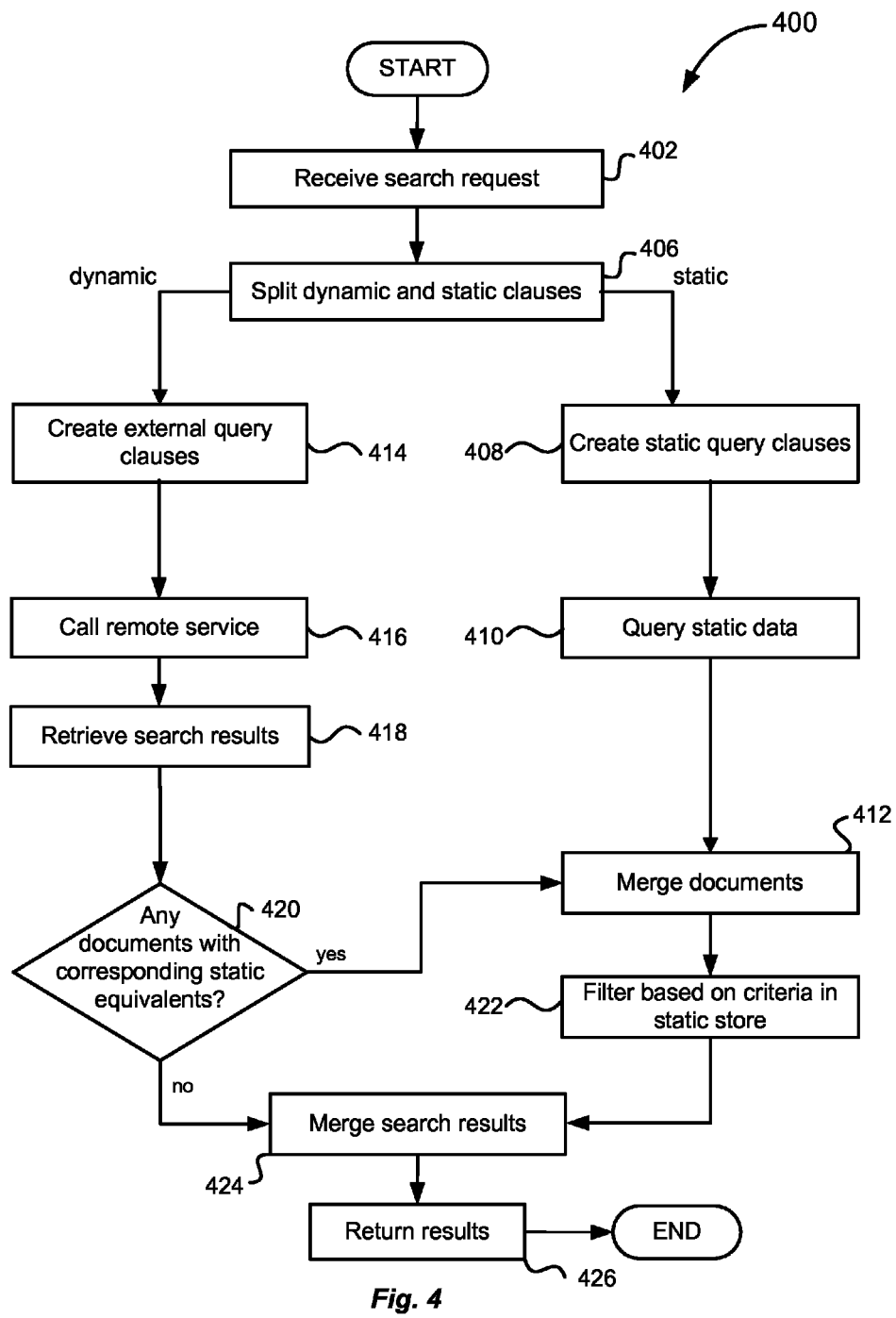
FIG. 4 illustrates a process flow diagram for adding dynamic data to a static search engine in accordance with an embodiment.

FIG. 4 illustrates a process flow diagram 400 for operation of the search service implemented by the engine 308 and the remote service 310 in accordance with an embodiment. The process 400 begins at block 402, where a search request is received from a client device 302. As discussed above, the search request may take a form of a search query and may contain one or more search criteria. At block 406, the query clauses may be "split" into dynamic and static clauses. The query clauses associated with the request may be parsed to determine whether they contain any attributes (identifiers) related to dynamic and/or static data. The determination of dynamic identifiers may be done by providing a plurality of identifiers related to dynamic data to a search engine beforehand. In that case, the engine simply recognizes an identifier related to dynamic data when the query is parsed. In another embodiment, the search engine may not recognize an identifier included in the query as "static" and determine that a found identifier must be related to dynamic data. In one embodiment, this determination may be made at the query parsing time. When both static and dynamic identifiers are identified, the search may be run "in parallel" for both static and dynamic data as shown in FIG. 4. Thus, for the static data search, at block 408 the search engine creates a standard query and at block 410 searches the static data source (e.g., data contained in the content data store 312 shown in FIG. 3). The query results (e.g., documents) are returned to the user at block 412.

For the dynamic data search, at block 414 an external query clause is created. In one embodiment, an attribute identifying a user requesting a search (e.g., user ID) may be added to the query data. An external query clause may "behave" the same as a standard query clause with respect to input into the query and the query's output. In another embodiment, as discussed above, any attribute in a query that does not pertain particularly to "static" data stored in a static data store may be identified as an attribute related to dynamic data.

As discussed above, in some applications, the dynamic or volatile data may be related to "personal" or "personalized" data associated with a particular user, such as product ratings, film reviews, book lists or other types of user-related data entered by the user. Accordingly, a user ID may be utilized for a search done on the dynamic data. At block 416, remote service 310 shown in FIG. 3 is called to query a dynamic data source such as dynamic data store 314. At block 418, the search results are retrieved from the dynamic data source. In one embodiment, the search results returned from the remote service 310 may comprise a list of documents having public identifiers (e.g., title identifiers) associated with one or more attributes related to dynamic data and contained in the original search request. It is to be understood that any type of public identifiers associated with dynamic data items may be returned by the remote service. At block 420, it is determined whether there are any static data items with public identifiers that correspond to the data items with public identifiers returned by the remote service. This determination may be made in cases where filtering of the retrieved dynamic data needs to be done using the static data items with matching identifiers. However, if no filtering needs to be done, the above determination does not have to be made. Returning to block 420, if any matches are found, at block 412 the documents found by the static data search are merged with the matching documents found by the dynamic data search. At block 422 the documents are filtered based on the search criteria, then at block 424 the search results are combined and at block 426 returned to the user. The matching of dynamic data items to static data items is described in greater detail in reference to FIG. 6. If no matches are found at block 420, the dynamic data and static data search results are merged at block 424 and the results are returned at block 426. As discussed above, the static identifiers (attributes) may not be found in the search request, in which case the search engine employs the remote service to search the dynamic data sources only (as illustrated by the dynamic search branch of the process flow in FIG. 4).

Figure 5:
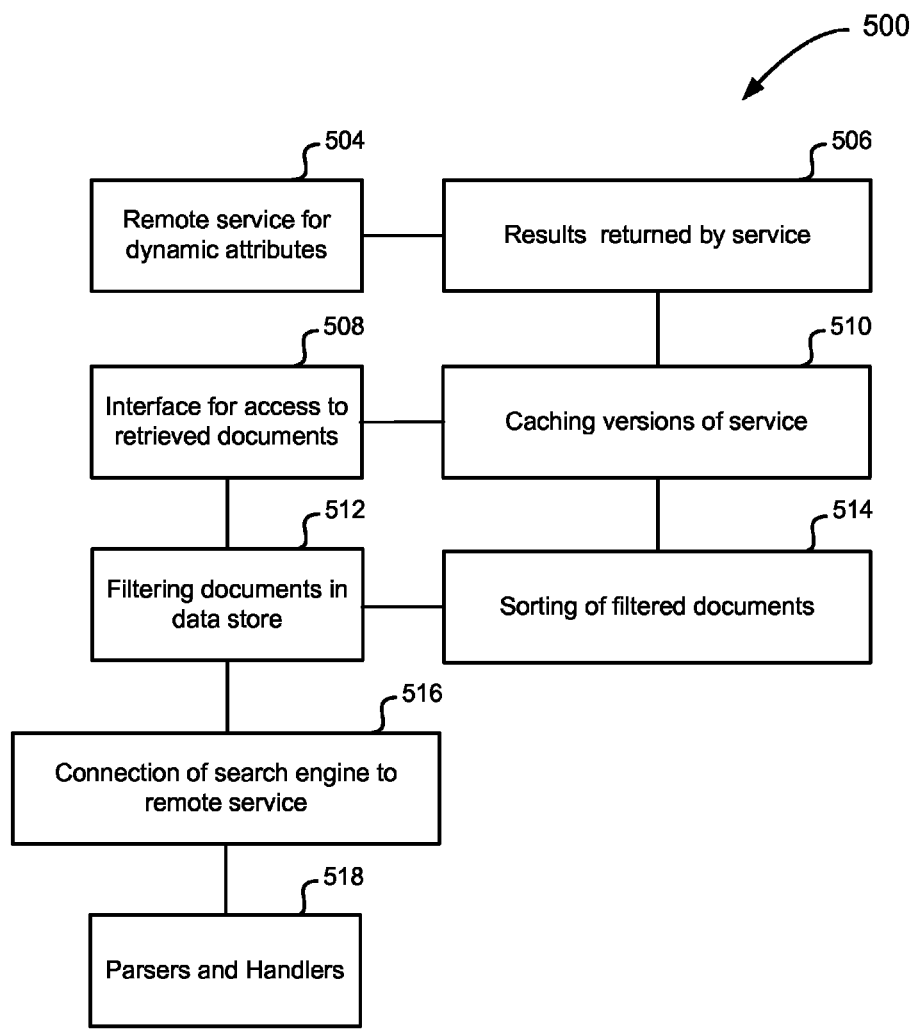
FIG. 5 illustrates a process flow diagram for adding dynamic data to a static search engine in detail in accordance with an embodiment.

FIG. 5 illustrates a block diagram 500 for the remote service implementation in accordance with an embodiment. Block 504 illustrates a remote service for dynamic attributes (identifiers). As discussed above, the service may contain particular attributes, or search criteria, that pertain to dynamic data, for example, entity ratings or list of titles. Block 506 illustrates functionality of the remote service that returns results matching one or more of the attributes that pertain to dynamic data (in response to a query delivered to the remote service by the search engine). For illustrative purposes only, the dynamic attribute may include, for example, a user's ratings or preferred list of titles. An example remote service may be implemented as a JSON-RPC service and composed as in these examples:

```
get_user_ratings({user_id=>string, data_class=>string})
get_user_favorites({user_id=>string,
    data_class=>string})
Return values are shown in the below example:
{"result":{"movies":"ratings":[{"date":"2010-01-01",
    "rating":5,"key":"tt0009968"}, . . . ]},"class":"user_
    ratings"}}
{"result": "movies":[
{"date":"2000-03-06","key":"tt0066026"},{"date":
    "0000-00-00","key":"tt0120802"},{"date":"0000-00-
    00","key":"tt0115669"},
{"date":"2000-03-05","key":"tt0100519"},      {"date":
    "2006-01-17","key":"tt0110877"},{"date":"2006-02-
    16","key":"tt0354899"},
{"date": "2006-11-20","key":"tt0046268"}
],"class":"user_favorites"}}
```

Block 508 illustrates another functionality of the implementation, namely, an interface for access to retrieved documents. In one embodiment, using the example provided above, Java classes for UserRatingsService and UserFavoritesService provide access to the remote services created above. Caching versions of these services may also be created (as illustrated in block 510); for example, identical service calls from within a single top-level query should be cached for efficiency (e.g. a query to show the titles a user has rated sorted by the rating they gave should not require two service calls). The illustrative package could be used by any Java program. The illustrative example of the schema package that defines classes which represent inputs and outputs for the service calls are shown in the below example:

```
abstract public class RemoteService {
private final static String jsonVersion="1.1";
abstract public String getServiceId( )
public  JSONRPCRequest  makeRequest(MyListSpec
    spec) throws ServiceException;
public   DocumentSet   getResults(JSONRPCRequest
    request) throws ServiceException;
public static Map makeRequestOptionsMap(Object . . .
    keysAndValues)
{
    for (int i=0; i<keysAndValues.length; i+=2)
        options.put(keysAndValues[i],  keysAndValues[i+
            1]);
    return options;
}
}
```

Block 512 illustrates a filtering service; specifically, the documents stored in the static data store (e.g., Lucene®) that correspond to identifiers returned by the remote service may be selected or filtered. In the Lucene®-based implementation of the technique, a new class is created which behaves like FieldQuery. Specifically, a generic FieldValuesFilter class may be created which takes a field_name and a list of field_ values and filters documents accordingly. Lucene's FilteredQuery allows for filtering a MatchAllDocsQuery by this FieldValuesFilter. An example of a single query for matching multiple values against a single field is presented below:

```
public DocIdSet getDocIdSet(IndexReader reader)
throws IOException
{
BitSet bitset=new BitSet(reader.maxDoc( ));
int docs[ ]=new int[1];
int freqs[ ]=new int[1];
int filtered=0;
String[ ] values;
try {
    values=(String [ ]) field_values.getValues( );
} catch (Exception e) {
    throw new IOException(e);
}
if(values.length>0)
{
    for(int i=0; i<values.length; i++)
    {
        String this_value=values[i];
        if (this_value==null)
            continue;
        TermDocs   termdocs=reader.termDocs(new   Term
            (field_name, this_value));
        int j=termdocs.read(docs, freqs);
        if(j==1) {
            bitset.set(docs[0]);
            filtered++;
        }
    }
}
return new DocIdBitSet(bitset);
}
```

The filtered documents may be sorted at block 514. In one example, Lucene®-based sorting is implemented via the SortComparatorSource factory interface. To connect Lucene® to the remote service, a Lucene® query may be configured to match documents based on values retrieved from the remote service, and also to sort results based on values obtained from a remote service (block 516). An example of the Lucene® query implementation is presented below:

```
// Get the list of titles
EntityServiceRequest request=ratings service.requestRat-
    ingsServicePerformance( . . . uconst, "tconst",
    "overall" . . . );
RatingsServicePerformance   ratings=ratings   service.ge-
    tRatingsServicePerformance(request);
String[ ] tconsts_voted_on=ratings.getRatingsMap( ).key-
    Set( ).toArray( );
// Run the query with the retrieved values
FieldValues   values=new   StaticFieldValues(entities_vot-
    ed_on);
Query_lucene  query=new  FilteredQuery(MatchAllDocs
    Query, new FieldValuesFilter("tconst", values)).
```

One skilled in the art will appreciate that programs that can make arbitrary combinations of internal and external queries may be developed. In one example, Lucene® programs in Java may be written for this purpose. In this example, it is important to note that Lucene® and Solr® have their own query languages and parsers to allow queries to be generated from a string input, so the external queries should be made compatible with that. In order to achieve this, the Lucene® and Solr® parsers may be extended so as to be able to recognize how and when to create external queries. Block 518 illustrates parsers and handlers that may be created to allow for the compatibility of external queries coded in Java with Lucene® and Solr® query languages. As one skilled in the art will appreciate, different additional functionalities may be provided in the implementation illustrated in FIG. 5. For example, applications that are configured to call the remote service (that may be implemented in Solr® as discussed above) may request that the results returned by the remote service be displayed. In our example, a list of titles sorted by ratings may be displayed. Other requests of a similar nature may also be made. The illustrated implementation allows for creating a customized request handler, e.g., EntityRequestHandler which may splice any data retrieved from the remote service that matches the returned document set into the result stream.

As discussed above, when the filtering of retrieved dynamic data results is required, public identifiers of the retrieved dynamic data are matched with identifiers pertaining to data stored in the "static" data store. If any matches between the identifiers are identified, the matched static data is merged with the dynamic data returned from the remote service. The resulting combination of static data and dynamic data is returned to a user in response to a query. As noted above, a public identifier may include, for example, a document identifier associated with a data item. Conventional data storage systems typically use their own, "internal" document identifiers (ID) that may change every time the system gets updated, e.g., when the data stored in the system gets changed. In such cases, a database index using internal document identifiers may be reloaded and the internal document IDs may be updated. However, the data matching described above (e.g., the matching occurring at block 420 of FIG. 4) requires a one-to-one matching of an "external" public identifier of a document returned by the remote service to an internal document ID. A technique that provides for such matching is described below in reference to FIG. 6.

Figure 6:
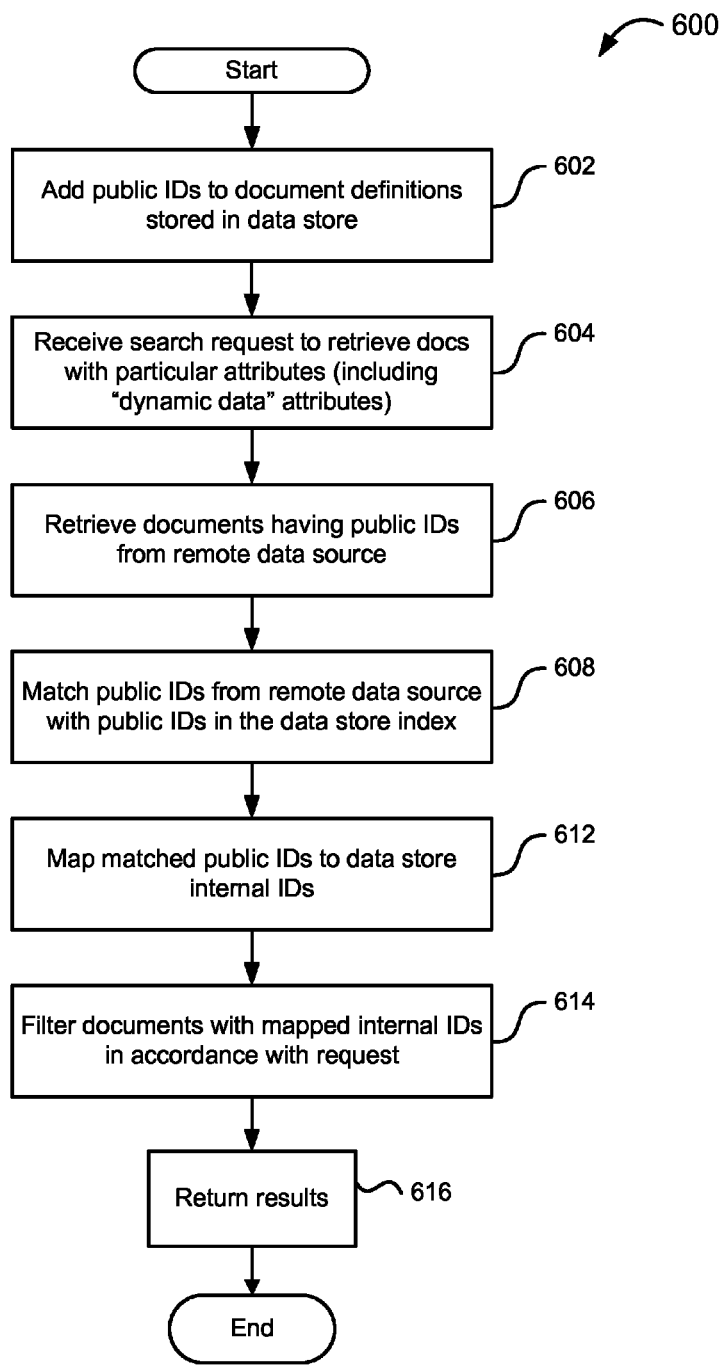
FIG. 6 illustrates a process flow diagram for mapping dynamic data identifiers to internal data identifiers of "static" data in accordance with an embodiment.

FIG. 6 illustrates a process flow diagram for matching a public identifier (public ID) returned by the remote service to an internal document ID associated with a document stored in a static data store. The process 600 begins at block 602, where each document stored in a static data store is assigned an identifier, such as a public ID. In one embodiment, an extra field containing an identifier may be added to a document definition in the static data store. As discussed above in reference to FIG. 4, a public ID may be a document title, document title ID or any other type of identifier. Dynamic data stored in a "remote" data storage (data source) may also have public IDs associated with it. Thus, when at block 604, a search request is received that contains dynamic data attributes, at block 606 the remote service returns documents (in one embodiment, document titles), each containing a public ID associated with it. At block 608, public IDs returned by the remote service are compared with any public IDs stored by the "static" data store (typically, by accessing a storage index) and matching public IDs are identified. If, at block 610, matching IDs are identified, the matched public IDs are mapped to internal IDs associated with the documents for which matched public IDs were found, at block 612. At block 614, the documents with mapped internal IDs are filtered and at block 616 the results are returned to a user who submitted the search request.

It is important to note that any number of arbitrary remote services may be used in order to fetch dynamic data from a plurality of dynamic data sources in order to combine the dynamic data with static data. The search engine configured to create external clauses to search a dynamic data source may serve as a "broker" (e.g., a building logic operator) of complex queries involving multiple external clauses as long as the remote services may use unique identifiers (such as lists of titles) that pertain to each dynamic data source.

As discussed above, the various embodiments can be implemented in a wide variety of operating environments, which in some cases can include one or more client computers, computing devices, or processing devices which can be used to operate any of a number of applications. Client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response to requests from client devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation, those commercially available from Oracle °, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, and the like.

Such devices also can include a computer-readable storage media reader, a communications device (e.g., a modem, a network card (wireless or wired), an infrared communication device), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the present disclosure as set forth in the claims.

What is claimed is:

1. A computer-implemented method for searching a dynamic data source using a static search engine, comprising:
    under control of one or more computer systems configured with executable instructions,
        receiving a request to search for content, the request including at least one first attribute associated with static data stored in one or more static data sources and at least one second attribute associated with dynamic data stored in one or more dynamic data sources;
        creating an external query including at least the at least one second attribute associated with the dynamic data;
        retrieving the dynamic data from the one or more dynamic data sources corresponding at least in part to the external query and the static data from the one or more static data sources corresponding at least in part to the at least one first attribute;
        filtering the retrieved dynamic data to obtain a subset of the retrieved dynamic data, each of the subset of the retrieved dynamic data associated with a respective public document identifier that matches a public document identifier associated with one of the retrieved static data; and
        returning search results comprising a combination of the subset of the retrieved dynamic data and the retrieved static data in response to the request.

2. The computer-implemented method of claim 1, wherein the request comprises at least one standard query clause corresponding to the at least one first attribute associated with the static data.

3. A computer-implemented method for searching a dynamic data source using a static search engine, comprising:
    under control of one or more computer systems configured with executable instructions,
        creating an external query based at least in part upon a search request for data that includes at least one attribute associated with dynamic data, the external query including at least the at least one attribute associated with the dynamic data;
        retrieving the dynamic data corresponding at least in part to the external query and static data corresponding at least in part to the search request;
        filtering the retrieved dynamic data to obtain a subset of the retrieved dynamic data, each of the subset of the retrieved dynamic data associated with a respective public document identifier that matches a public document identifier associated with one of the retrieved static data; and
        returning search results comprising a combination of the subset of the retrieved dynamic data and the retrieved static data in response to the search request.

4. The computer-implemented method of claim 3, wherein the search request further includes at least one attribute associated with the static data.

5. The computer-implemented method of claim 3, further comprising:
    creating at least one class corresponding to a remote service configured to search for the dynamic data, the at least one class providing access to the remote service for the static search engine configured to search for the static data.

6. The computer-implemented method of claim 3, wherein the filtered, retrieved dynamic data and the retrieved static data are combined based at least in part upon public identifiers associated with the retrieved dynamic data and the retrieved static data.

7. The computer-implemented method of claim 5, wherein the static data is stored in a database comprising a Lucene software library and wherein the static search engine comprises a Solr-based search engine.

8. A computer-implemented method for searching a dynamic data source using a static search engine, comprising:
    under control of one or more computer systems configured with executable instructions, receiving a request to search for data, the request including at least one first attribute associated with dynamic data and at least one second attribute associated with static data;

creating an external query including at least the at least one first attribute associated with the dynamic data;

searching for and returning the dynamic data corresponding at least in part to the external query and static data corresponding at least in part to the at least one second attribute;

filtering the returned dynamic data to obtain a subset of the returned dynamic data, each of the subset of the returned dynamic data associated with a respective public document identifier that matches a public document identifier associated with one of the returned static data; and returning search results comprising a combination of the subset of the returned dynamic data and the returned static data in response to the request.

9. The computer-implemented method of claim 8, wherein the static data is stored in a data store and searching and returning the static data is based at least in part upon an index of the data store.

10. The computer-implemented method of claim 8, wherein the request includes an identifier associated with a user who submitted the request.

11. The computer-implemented method of claim 8, wherein the dynamic data is stored in a remote data source.

12. A computer system for searching a dynamic data source using a static search engine, the system comprising a processor and a memory having executable instructions that, when executed on the processor, cause the processor to:

create an external query based at least in part upon a search request for data that includes at least one attribute associated with dynamic data, the external query including at least the at least one attribute associated with the dynamic data;

retrieve the dynamic data corresponding at least in part to the external query and static data corresponding at least in part to the search request;

filter the retrieved dynamic data to obtain a subset of the retrieved dynamic data, each of the subset of the retrieved dynamic data associated with a respective public document identifier that matches a public document identifier associated with one of the retrieved static data; and return search results comprising a combination of the filtered, retrieved dynamic data with the retrieved static data in response to the search request.

13. The computer system of claim 12, wherein the executable instructions further cause the processor to:

create at least one class corresponding to a remote service configured to search for the dynamic data, the at least one class providing access to the remote service for the static search engine configured to search for the static data.

14. The computer system of claim 12, wherein the filtered, retrieved dynamic data and the retrieved static data are combined based at least in part upon public identifiers associated with the retrieved dynamic data and the retrieved static data.

15. The computer system of claim 12, wherein the static data is stored in a database comprising a Lucene software library and the static search engine comprises a Solr-based search engine.

16. A non-transitory computer-readable storage medium having computer-executable instructions stored thereon that, when executed by a computer, cause the computer to:

create an external query based at least in part upon a search request for data that includes at least one attribute associated with dynamic data, the external query including at least the at least one attribute associated with the dynamic data;

retrieve the dynamic data corresponding at least in part to the external query and static data corresponding at least in part to the search request;

filtering the retrieved dynamic data to obtain a subset of the retrieved dynamic data, each of the subset of the retrieved dynamic data associated with a respective public document identifier that matches a public document identifier associated with one of the retrieved static data; and return search results comprising a combination of the filtered, retrieved dynamic data and the retrieved static data in response to the search request.

17. The non-transitory computer-readable storage medium of claim 16, wherein the computer-executable instructions when executed by the computer further cause the computer to:

create at least one class corresponding to a remote service configured to search for the dynamic data, the at least one class providing access to the remote service for a static search engine configured to search for the static data.

18. The non-transitory computer-readable storage medium of claim 17, wherein the filtered, retrieved dynamic data and the retrieved static data are combined based at least in part upon public identifiers associated with the retrieved dynamic data and the retrieved static data.

19. The non-transitory computer-readable storage medium of claim 17, wherein the static data is stored in a database comprising a Lucene software library and wherein the static search engine comprises a Solr-based search engine.

* * * * *